United States Patent [19]
Gunsalus

[11] 3,831,237
[45] Aug. 27, 1974

[54] MOUNTING APPARATUS FOR INDEXABLE CUTTING INSERTS

[76] Inventor: Claude A. Gunsalus, 19349 E. Tudor St., Covina, Calif. 91722

[22] Filed: July 20, 1972

[21] Appl. No.: 273,357

[52] U.S. Cl. ............................................ 29/105 R
[51] Int. Cl. ................................................ B26d 1/12
[58] Field of Search ...................... 29/105, 105 A

[56] References Cited
UNITED STATES PATENTS

| | | |
|---|---|---|
| 1,964,786 | 7/1934 | McLean ........................ 29/105 X |
| 2,664,617 | 1/1954 | Kralowetz ........................ 29/105 |
| 3,121,939 | 2/1964 | Williams ........................ 29/96 |
| 3,339,257 | 9/1967 | Hargreaves et al. ........ 29/105 |
| 3,526,025 | 9/1970 | Sletten ........................ 29/95.1 |

*Primary Examiner*—Harrison L. Hinson
*Attorney, Agent, or Firm*—Smyth, Roston & Pavitt

[57] ABSTRACT

A rotatable milling cutter in which indexable milling inserts are positively retained within cavities at the end of the cutter body by a positive retention apparatus which may be embodied by a setscrew passing through a wedge to abut the side and/or bottom of a recess or pocket in one surface of the insert.

11 Claims, 8 Drawing Figures

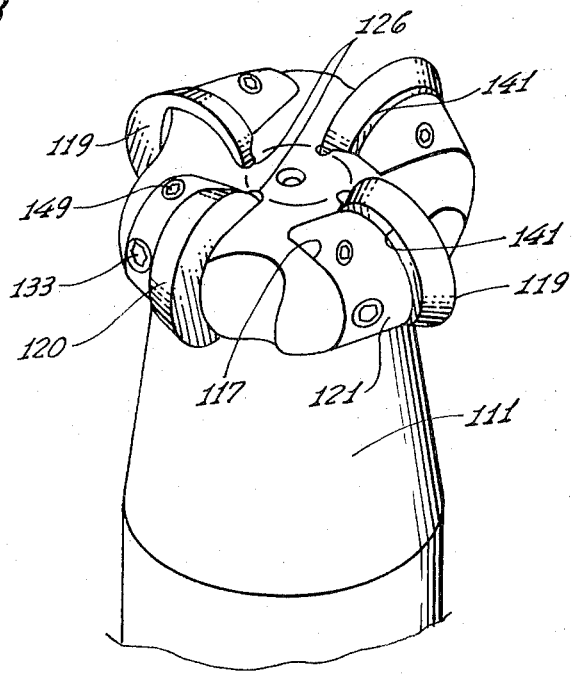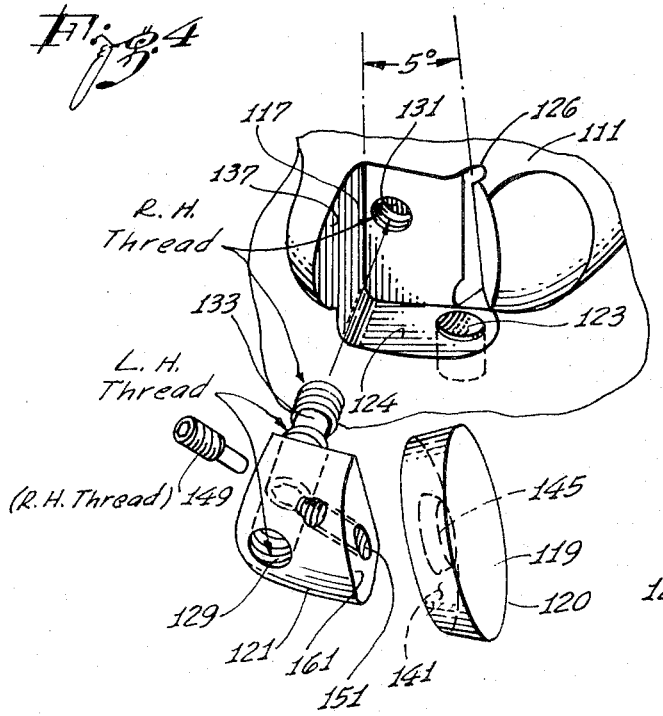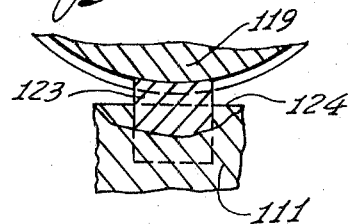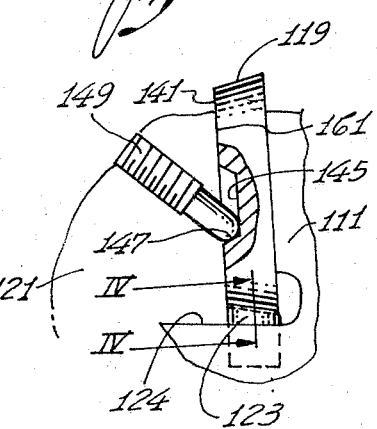

MOUNTING APPARATUS FOR INDEXABLE CUTTING INSERTS

BACKGROUND OF THE INVENTION

This invention relates to the art of rotatable milling cutters having a plurality of cutter teeth or inserts. More particularly, the invention relates to improved apparatus for retaining the inserts within the cutter body.

The process of milling normally utilizes a rotatable or otherwise movable cutting tool to remove a predetermined amount of material from a surface of a workpiece in such a manner as to leave the machined surface uniform and smooth.

One well-known type of milling machine utilizes a removable attachment or body which, in many cases, is substantially cylindrical and is rotated by the machine about its axis. Although rotational velocity may vary significantly, in most operations the body is rotated at high speed relative to the feed of the tool across the workpiece so that the "bite" of the tool during each rotation is rather small. Such an operation results in a smooth finish on the machined surface and a uniform thickness of the remaining workpiece; there is relatively little "chattering" of the cutter against the workpiece since very little reaction force will be generated between the material being machined away and the attachment.

Most such rotatable cutter bodies include various structures at the normally exposed end of the body which are designed to retain cutting inserts therein. The inserts may be manufactured from any suitable material such as tungsten carbide. In many instances, they are indexable to expose a number of distinct portions of the cutting edge seriatim in order to allow repositioning and presentation of a sharp edge when wear has occurred. It is also a well-known advantage of such indexable inserts that, when an insert becomes worn throughout the entire extent of its cutting edge, it can be removed from the body and replaced.

As a result, the use of indexable inserts has become widespread and such inserts have been provided with a number of shapes and configurations in order to lengthen their useful lives in accordance with the specific machining operation to be accomplished. For example, the cutting edges of such inserts may extend about a circular periphery, one which is a form of parallelagram, trapizoid, or any desired configuration. Further, such inserts are mounted in the cutter bodies at a variety of rake angles depending upon the operation to be accomplished.

When the cutter body is observed from a position along the axis thereof beyond the end of the body, the radial rake angle of an insert can be determined by drawing an imaginary diameter line through the axis of the cutter body and tangent to the closest portion of the cutting edge of the insert. If the cutting edge is substantially parallel to the diagonal, the insert is said to have a zero radial rake angle. On the other hand, if, when the insert is viewed as being above the axis, the cutting edge crosses the diameter line from right to left as the radius increases, the radial rake angle is said to be positive. Similarly, if the cutting edge crosses the diameter line from left to right, when the insert is viewed as being above the axis, the radial rake angle is said to be negative.

To determine the axial rake angle, the cutter body is viewed from the side and an imaginary line is passed tangent to the cutting edge parallel to the axis of the body. If the cutting edge is parallel to the imaginary line, the axial rake angle is said to be zero; if the cutting edge crosses the imaginary line from top left to bottom right, the angle is negative; and if the cutting edge crosses the imaginary line from top right to bottom left, the axial rake angle is positive.

In practice, any combination of axial and radial rake angles may be utilized depending on the geometry of the inserts, the design of the cutter body, the material to be machined, the geometry of the finished workpiece, and the specific type of machining operation to be accomplished on the workpiece.

In order to fasten cutting inserts on the cutter body, a wide selection of structures for locking the inserts in place has been made available. One type of structure has embodied a clamping block which is located so as to extend beyond the sides of the cutter body as a lip which fits over the insert. The clamping block is then fixed to the cutter body by screws. The clamping block is provided with sloping surfaces on at least one side thereof, one of which cooperates with a sloped surface on the insert opening in the cutter body and the other of which, ending at the lip, cooperates with a rear surface of the insert itself. As the screws are tightened into the cutter body, the clamping block is wedged between the side of the insert opening and the insert itself. The lip on the clamping block then prevents inadvertent radial movement of the insert to prevent it from being removed from the cutter body due to reaction with the workpiece. Unfortunately, this type of milling cutter is limited in its usage since the clamping blocks extend beyond the inserts and the lips prevent the inserts from extending beyond the periphery of the cutter body or block. Consequently, such milling cutters are not suitable for many milling operations which require a distinct extension of the radial periphery of the insert beyond the periphery of the cutter body.

In another type of structure, milling cutter inserts which extend beyond the periphery of the cutter body are installed in insert receptacles. A wedging block is then installed into the receptacle in such a manner that, as a bolt passing through the block is tightened into the cutter body, the wedging block is pulled tightly against the insert to hold it in place. It has been found in many instances, however, that such inserts, even when provided with serrated surfaces, can be pulled out of the cutter bodies during machining operations unless great care is exercised in controlling the depth of cut and feed velocity. In other words, an inexperienced machine operator can cause both the workpiece and the machine to be seriously damaged if, for example, he runs the machine at too high a feed rate, causing one or more of the inserts to be propelled from the cutter body due to reaction with the workpiece. Of course, it is also conceivable that the operator himself may be injured when the insert is pulled out of the cutter body but, at the very least, the remaining inserts will be damaged as each takes up a portion of the load no longer being borne by the displaced insert.

Consequently, it has become necessary and desirable to develop a milling insert which can be positively retained within the cutter body to prevent the inadvertent removal therefrom during any milling operation.

SUMMARY OF THE INVENTION

The present invention relates to such structure and, more particularly, to structure which may be utilized to retain a cutting insert within the cutter body during heretofore nearly impossible or impractical milling operations, with this simple type of indexable insert, such as milling away a sloped surface. Of course, a plurality of inserts may be similarly mounted on the body.

Still more particularly, the present invention relates to a secondary mechanical positive lock which may be used to positively retain a recessed insert in place in a cutter body. Of great importance is the feature that the invention can be utilized with such inserts regardless of the radial or axial rake angles. In very general terms, the invention comprises a secondary mechanical positive lock which includes structure located so as to positively retain an insert within the cutter body.

In the preferred embodiment of the invention, a cup or pocket may be formed in the surface of an insert which is to be located adjacent the clamping block within the cutter body recess or cavity. The clamping block may be formed with a suitable means, such as a setscrew or differential screw which passes through the block and seats the block in the body cavity. A suitable secondary locking screw may be utilized to positively retain the insert within the cutter body cavity or recess by being forced against the cup in the insert. If the pocket or cup formed in the surface of the insert is provided so as to be substantially circular with a sloping sidewall, the locking screw may be positively seated against the sloping sidewall. The advantage of this relationship is that the removable insert can be indexed to a variety of positions and still be positively locked regardless of the position to which it is indexed. In any event, the dimensional relationship between the nearest point on the cutting edge of the insert and the point of contact between the locking setscrew and the cup is such that the distance between them is less than the radius of the insert. If the insert is properly seated against a supporting surface in the recess, it cannot move past the edges of the cavity due to the compressive reaction force generated by the setscrew during any operation which tends to pull the insert from the cutter body.

As a result, damage to the machine and injury to the operator will be significantly reduced even if an inexperienced operator should misset the machine's speeds. Further, the capacity and capability of such milling cutters will be significantly increased by use of the present invention because the cutters can be utilized to accomplish more difficult milling jobs which were impossible with prior art indexable milling cutters from which the inserts could be driven by reaction against the workpiece. For example, milling cutters utilizing the present invention can be used to either ramp up or mill away a ramp on a workpiece. In other words, a sloped surface or ramp can be formed on an exposed surface of the workpiece in an operation in which the milling inserts take a greater bite or cut into the workpiece at one side of the cutter body than at the other during rotation of the body. Even in these instances, the inserts will not be either expelled or rolled out of the body as a result of the compressive reaction forces exerted against the cup or pocket in the insert.

In one preferred embodiment of the present invention, the clamping block or wedge may be provided with a threaded bore which is located so as to be coaxial with a similar but oppositely threaded bore in the milling cutter body. When the insert is properly positioned within the cavity in the cutter body, the clamping block may be inserted behind the insert and a differential screw, having oppositely directed threads on each end thereof, may then be turned into the bores in the cutter body and the clamping block, causing the clamping block to be pulled into the cavity and into wedging contact with the insert. When this occurs, a wedging surface on the clamping block, preferably located adjacent the rear surface of the insert, will cause the insert to be firmly held in place.

In order to positively lock the insert in place, a locking setscrew may be threaded through the clamping block so as to extend therefrom through the wedging surface which is in abutment with a face of the insert. As the locking screw is turned to extend further beyond the wedging surface of the clamping block, it will eventually come into contact with the side of a cup or pocket in the adjacent surface of the insert. Proper design of the pocket and locking screw relationship will cause the distance between the point of abutment thereof and the most nearly adjacent peripheral edge of the insert to be less than the radius of the insert. If the recess in the cutter body is formed so as to be substantially complementary to the portion of the insert immediately adjacent thereto, the insert will be unable to rotate out of the cavity as a result of reaction pressure with the workpiece because any such tendency merely will cause a greater reaction to be exerted on the cup or pocket in the insert by the locking screw.

Thus with this structure, the cutter insert cannot be inadvertently removed from the cutter body during operation and all of the above-described advantages of the present invention become immediately available. As stated previously, this invention can be utilized regardless of the radial and axial rake angles of the inserts, and may be as simple or complex as necessary for the particular structure to be utilized. For example, if the locking setscrew can be located so that its axis lies within the same horizontal plane as the axis of the differential setscrew, only a single wedging action of the clamping block will be required to accomplish the desired results. On the other hand, when the geometry of the machine is such that the locking screw cannot be located so that its axis is in the same plane as the axis of the differential screw, the clamping block may be provided with a compound wedging surface in order to create the positive lock.

Thus, the surface of the clamping block which enters into cooperative abutment with the surface of the insert containing the pocket may be provided with a wedging surface formed at an angle which causes the clamping block to exert a generally radial wedging force as it is drawn into the cavity by the differential screw. That same angular surface may also cause the exertion of a generally axial wedging force when the second setscrew is actuated against the cup in the insert, thus resulting in the insert being wedged into the cavity by the block along two different lines of motion.

It will therefore be seen by those skilled in the art, upon perusal of the following Detailed Description taken together with the accompanying drawings, that the present invention may be utilized in a variety of ways, each providing the tool designer and operator with a secondary mechanical positive locking system which increases the working capabilities of the tool, the safety of the operator, and the quality of the workpieces machined.

Other advantages and objects of the present invention will now become apparent to those skilled in the art, as will additional embodiments and modes of the invention which differ greatly from those hereinafter illustrated and described. However, it will also be realized that the illustrations and Detailed Description merely describe presently preferred embodiments of an invention, the latter defined only by the claims hereof.

BRIEF DESCRIPTION OF THE DRAWINGS

FIG. 3 comprises a perspective view of a second embodiment of a milling cutter employing the present invention;

FIG. 4 comprises an exploded view of a portion of the milling cutter illustrated in FIG. 3;

FIGS. 5 and 6 are partial views of the structure illustrated in FIG. 4, illustrating the details of cooperation therebetween.

DETAILED DESCRIPTION

Figure 1:
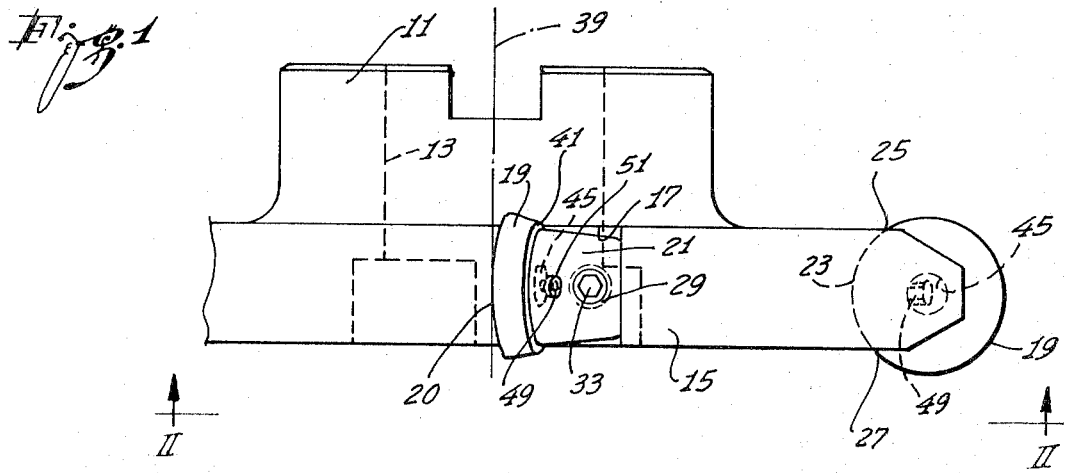
FIG. 1 is a partial side elevation of a milling cutter utilizing the present invention.
Figure 2:
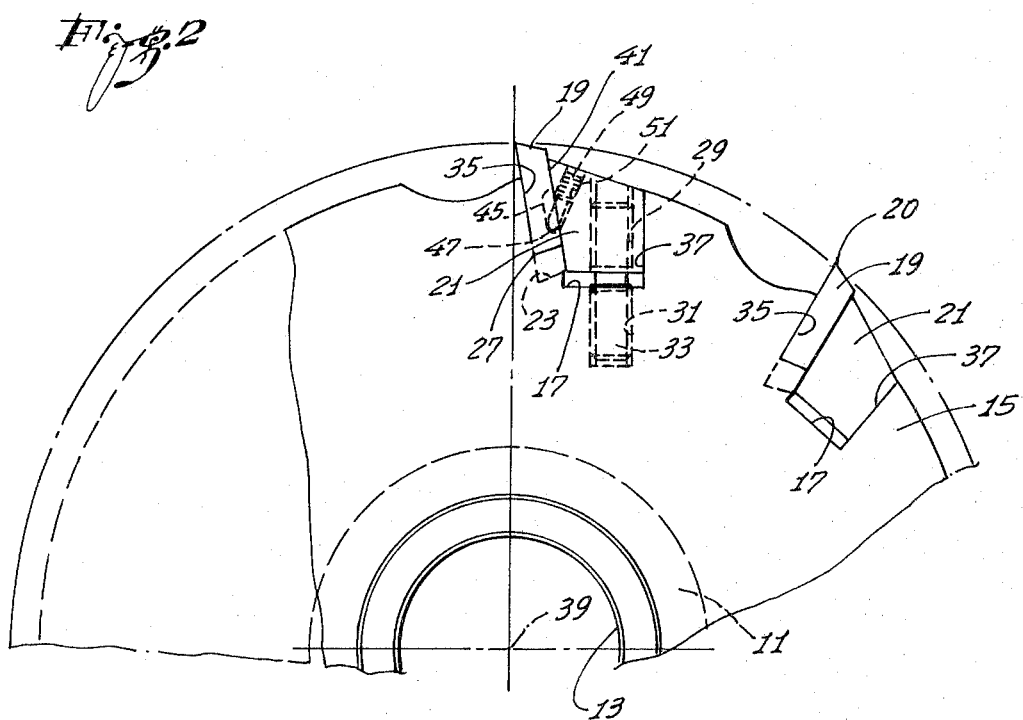
FIG. 2 comprises a partial plan view of the cutter shown in FIG. 1, as seen along a line II—II.

Referring now to FIGS. 1 and 2, there is shown a cutter body 11 having a suitable bore 13 so that the body may be properly mounted on a spindle in any usual manner. If desired, a flange 15 may be formed at the lower end of the cutter body and provided with a suitable number of recesses or cavities 17 into which cutting insert blades 19 and clamping or wedging blocks 21 may be inserted and positioned.

As shown in FIG. 1, the rear wall of each cavity 17 is provided with a curved insert-receiving surface 23 which terminates at the upper and lower edges of the flange 15 at points 25 and 27. In this manner, each insert may be firmly seated at the rear of its associated cavity.

Each wedge or clamping block is provided with a suitable threaded bore 29 which is formed therein so as to be in substantially coaxial relationship with an oppositely threaded bore 31 in the flange 15. In this preferred embodiment of the invention, a differential screw 33, having oppositely directed threads on each end thereof, may be positioned within the bores 29 and 31 in such a manner as to draw the screw 33 into each of the bores as it is turned in a tightening direction. As this occurs, the block 21 is drawn into the recess 17 for a purpose to be described. Of course, any other type of structure could be used instead to draw the block 21 into the cavity.

Referring now to FIG. 2 more particularly, it will be seen that the sidewalls 35 and 37 of the cavity 17 are angularly related so as to diverge as the radius from the axis 39 of the cutter body increases. In use, the insert 19 is positioned within its respective cavity 17 by placing it against the wall 35 so that it properly seats against the inner surface 23. Subsequently, clamping block 21 is installed in the cavity 17 so as to abut the sidewall 37 of the recess and a surface 41 of the insert 19. When the differential screw 33 is turned so as to be tightened, it draws the block 21 into the cavity and the side edges of the block, which are angularly related at substantially the same angle as the sides of the recess, exert a wedging force between the cavity sidewall 37 and the insert surface 41 to firmly hold the insert against cavity sidewall 35.

An analysis of the structure thus far described will quickly reveal to those skilled in the art that if any vertical motion of the cutter is employed, the insert 19 may tend to rotate past either the edge point 25 or the edge point 27 of the inner recess surfaces 23. For example, if the cutter is utilized in a milling operation such that it is drawn vertically parallel to the axis 39, i.e., the cutter insert 19 is drawn upwardly along the side of the workpiece, the reactive forces of the workpiece will tend to cause the insert to rotate past the edge point 27 at the lower end of the inner wall 23. Similarly, if the cutter is utilized to provide a ramp or sloped surface on the face of a workpiece while being moved in substantially the horizontal direction, the insert may tend to rotate past the edge point 25 of the surface 23. In other words, even though the clamping block 21 is firmly fixed in position between the sidewall 37 and the insert 19, it can serve only as a primary positive lock to hold the insert in place. However, under certain conditions of usage, this primary lock will be insufficient to retain the insert; damage to the tool and workpiece as well as injury to the operator may occur if the insert should come out of the cavity.

In order to obviate this possibility, each of the inserts 19 may be provided with a pocket or cup 45 having sidewalls 47 which extend between the cup bottom and the surface 41. A lock screw 49 may be positioned within a threaded bore 51 in each clamping block 21 and tightened so as to abut an opposed portion of the wall 47 of the cup 45. Consequently, the lock screw 49 will tend to force the insert 19 tightly against the sidewall 35 and bottom wall 23 of the recess 17 and hold it in place.

In the embodiment illustrated in FIGS. 1 and 2, it can be seen that the axis of the lock screw 49 and the axis of the differential screw 33 lie along the same plane. Consequently, the clamping block 21 need only act to clamp the insert blade 19 in a single direction since the curved bottom surface 23 and the lock screw 49 will serve to prevent movement of the insert in any other direction. However, in tooling of this type, it often happens that it is impossible or undesirable to have both screw axes on the same plane.

As shown in FIG. 3 for example, a cutter body 111 having cavities 117 formed therein receives a plurality of cutter inserts 119, having cutting edges 120, which are locked in place by means of wedge blocks 121. Referring to FIG. 4, it can be seen that a threaded bore 131 having for example a right-hand thread, may be located within the cutter body 111 so as to be co-axially related to a wedge block bore 129 which may be provided with a left-hand thread. A differential screw 133 may be utilized to draw the wedge into the cavity 117 in the manner previously described so that the wedge becomes locked between a sidewall 137 of the recess and a surface 141 on the insert 119.

A pedestal 123 may be suitably located on a wall 124 in the cavity 117 so as to support the insert 119. As shown in FIG. 5, the pedestal 123 will serve to maintain that portion of the cutting edge 120 of the insert which is not in use or extending beyond the periphery of the cutter body away from the surface of the cavity so that it does not become damaged thereby. Similarly, a recess 126 may be formed at one end of the inner wall of the cavity for the same purpose. The important aspect of this structure involves its result and not its specific embodiment. In other words, it is only necessary that some structure be provided to properly seat the insert within the cavity while prohibiting contact between the cutting edge 120 and the cavity walls. Thus, the cutting edge will not be damaged or dulled by being forced against the cavity walls when the wedge locking elements are actuated.

A locking screw 149 may be threadedly mounted in a bore 151 within the clamping block 121 such that, when the insert 119 is installed within the recess 117, the locking screw will bear against a surface 147 at the side of a cup 145 in the surface 141 of the insert. Thus, the locking screw will hold the blade in place in essentially the same manner as that described relative to the embodiment of FIGS. 1 and 2. However, reference particularly to FIGS. 3 and 4 clearly illustrates that the axis of the locking screw 149 need not be located on the same plane as the axis of the differential screw 133.

Figure 7:
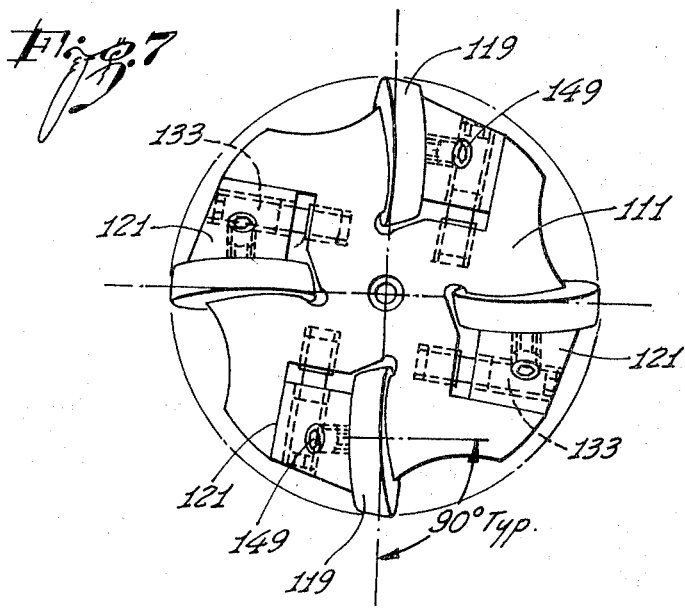
FIGS. 7 and 8 comprise plan and side elevation views, respectively, of an embodiment similar to that illustrated in FIGS. 3–6.

When the axis of the screws are not on the same plane, it has been found expedient to provide a surface 161 of the clamping block to be a compound wedging surface. Thus, surface 161 is formed so that the clamping block is narrower at the interior of the cavity than at the outer periphery of the cutter body and is narrower at the exposed surface of the block 121 than it is adjacent the cavity bottom. This feature of the surface 161 provides an additional advantage in that the clamping block 121 will serve to wedge insert 119 in place along two distinct directions. First, the differential screw 133 will lock the insert in place in substantially the same manner as that described relative to the first embodiment. Then, in view of the additional wedging slope of the surface 161 away from the surface 124 of the cavity, locking screw 149, when actuated against the surface 147 in the insert, will tend to drive the wedge out of the recess and toward the reader, as viewed in FIG. 7.

Since the leading surface of the insert 119 is positioned against an angled sidewall of the cavity, as illustrated in FIGS. 4 and 5, when the locking screw 119 is tightened it will move the clamping block in a direction such that surfaces 161 on the block and 141 on the blade are wedged into still tighter abutment. As a result, double wedging action of the clamping block 121 will cause the insert 119 to be tightly wedged into position and the action of the locking screw 149 in the cup 145 will positively lock the insert in place and prevent it from being rolled out of the recess in any direction of motion.

It will be realized, of course, that this invention can be utilized regardless of the wedge angle directions of the blocks or the radial and axial rake angles of the inserts. For example, referring to FIG. 7 it is seen that the inserts are installed in the cutter body 111 such that they each have a zero radial rake angle. If the cutter body recesses 117 were machined so that the inserts were slightly reoriented, either clockwise (positive radial rake angle) or counterclockwise (negative radial rake angle) from the positions illustrated in FIG. 7, the only change required would be to alter the axis of the threaded bore 151 so that the locking screw 149 would properly cooperate with the sidewall 147 of the cup 145.

Figure 8:
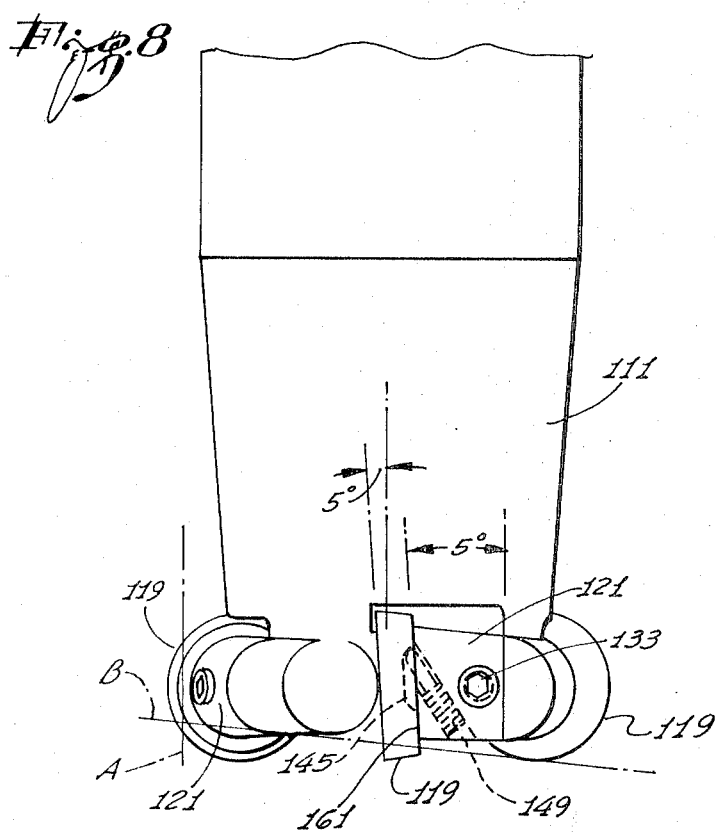

As shown in FIG. 8, the inserts 119 have been mounted at a negative axial rake angle. If, in fact, the blades are mounted in a zero radial rake angle, then the differential screw and locking screw may be related as shown in the embodiment illustrated in FIGS. 1 and 2. On the other hand, when the recesses are machined so that the inserts are held at a positive axial rake angle, then the differential screw and locking screw may accordingly be provided to act in different planes. For example, differential screw 133 might be provided to act parallel to the axis of the cutter body rather than in a plane perpendicular thereto and locking screw 149 might be provided to act in a plane which is perpendicular to the axis of the cutter body 111, similarly to the manner illustrated in FIGS. 1 and 2.

Thus it will be realized that the expedients of the present invention may be utilized to positively lock inserts in place regardless of the radial and axial rake angles by providing a locking screw which cooperates with a cup in a surface of the insert. When the locking screw and differential screw are located so that their axes are in the same plane, the clamping block may be provided with a wedging surface which acts along a single direction. However, when the axes of the differential screw and the secondary locking screw are angularly related such that they do not lie in the same plane, then the clamping block may be provided with a compound wedging surface which acts in one direction of motion under the influence of the differential screw and a second direction of motion under the influence of the locking screw. In either event, the inserts are positively prevented from being pulled out of the cutter body during milling operations.

Referring to FIG. 8, it can be seen that milling cutters formed in accordance with the present invention can be used in a variety of heretofore difficult milling operations while, at the same time, obviating the prior art problem of expulsion of the inserts from the cutter body during such operations. For example, if the line labeled "A" in FIG. 8 is considered to be a perfectly vertical line, and the line "B" is considered to be the surface of the workpiece, it can be seen that the cutting inserts closest to the line "A" will take a greater bite into the material of the workpiece than will those inserts most distant from the line "A" at any given instant of rotation of the cutter body 111. In difficult operations such as this, it becomes quite evident that the inserts 119 are subjected to considerable forces which tend to expell them from the recesses. With the prior art devices, this often occurred. However, when utilizing structure formed in accordance with the present invention, this possibility is totally obviated. If the feed speeds are excessive relative to the rotational speed of the milling cutter body 111, the machine may jamb or it might possibly damage the workpiece slightly. On the other hand, the tool itself will not likely be damaged and the possibility of injury to the operator by expelled inserts will be completely eliminated.

Consequently, the present invention provides a true advance over prior art tooling since it yields a necessary and desirable result which was heretofore unobtainable. Other modes and embodiments of the present invention will now become apparent to those skilled in the art without resulting in any structure which avoids the concepts of the invention as hereafter defined in the following claims.

I claim:

1. A milling cutter comprising
 a body having
  at least one cavity therein open to the periphery of said body and having
   at least one insert abutment means and
   at least one wedging surface therein,
 a milling insert having
  a first surface in abutment with said at least one abutment means,
  a cutting edge, and
  a holding means thereon, and
 a wedging means in abutment with said wedging surface and said milling insert and including
  means for fixing said wedging means within said cavity and
  means for generating a positive locking force between said wedging means and said insert holding means along an axis which intersects said insert holding means at a location thereon offset from the center thereof to prevent removal of said insert from said cavity regardless of the direction of movement of said body.

2. The milling cutter of claim 1 wherein
 said holding means in said insert comprises
  a cup formed with a continuous abutment surface and
 said force generating means comprises
  screw means which may be threaded through said wedging means and into contact with the abutment surface of said cup to positively retain said insert in said cavity.

3. The milling cutter of claim 1 wherein
 said fixing means and said force generating means comprise
  setscrew means oriented within said wedging means so that the axes thereof are in a common plane and
 said wedging means also includes
  a wedging surface so formed as to exert a wedging force on said milling insert in one direction of movement when one of said screw means is rotated through said wedging means.

4. The milling insert of claim 1 wherein
 said fixing means and said force generating means comprise
  screw means oriented within said wedging means so that the axes thereof do not lie in a common plane and
 said wedging means also includes
  a wedging surface so formed as to exert a wedging force on said milling insert in a first direction of movement upon rotation of one of said screw means and in a second direction of movement upon rotation of the other of said screw means.

5. An indexable milling cutter comprising
 a rotatable body having
  a cavity for receiving a cutting insert and
 means for retaining a cutting insert within said cavity comprising
  a clamping block having
   means thereon for compressively wedging a cutting insert between said clamping block and a wall of said cavity,
   means for selectively moving said clamping block into and out of wedging relationship with a cutting insert in said cavity, and
   means for selectively positively locking a cutting insert within said cavity including
    means for contacting and holding a cutting insert by exerting an axially directed force thereagainst at a location offset from the center of the insert.

6. The cutter of claim 5 wherein
 said wedging means includes
  a first surface on one portion of said clamping block for cooperation with a wall of said cavity and
  a second, opposed surface on another portion of said block and so angularly related to said first surface that said surfaces converge in a first direction.

7. The cutter of claim 6 wherein
 said first and second surfaces are so angularly related that said surfaces also converge in a second direction.

8. A milling cutter comprising
 a body rotatable about an axis and having
  a plurality of cavities formed about the periphery and adjacent one end thereof so as to be open to the periphery and adjacent end thereof, each cavity having
   a bottom wall,
   an inner wall, having
    a threaded aperture therein,
   a pair of sidewalls sloped so that each cavity is narrower at its said inner wall than at the periphery of said body and is wider at said bottom wall than at the end of said body,
   an insert cutter edge-receiving recess at the intersection of one of said sidewalls and said inner wall, and
   pedestal means located in said bottom wall adjacent said one of said sidewalls,
  an indexable milling insert mounted in each of said cavities adjacent said one of said sidewalls and positioned upon said pedestal such that that portion of the cutting edge of said insert which is within said cavity is located between said pedestal and said one of said sidewalls and within said recess, each insert having
   a cutting edge extending substantially about the periphery thereof and
   a cup formed in a surface thereof remote from said one of said cavity sidewalls and having
    an abutment surface about the periphery thereof, and
  wedge means having
   wedging surfaces thereon formed at substantially the same angle of slope as said cavity sidewalls,
   a first threaded aperture therein located in coaxial relationship with said threaded aperture in said inner wall,
   a differential screw means mounted in said first threaded aperture and said threaded aperture in said inner wall for movement of said wedge into and out of said cavity by rotation of said differential screw,
   a second threaded aperture extending between two intersecting surfaces of said wedge means, and a locking screw mounted in said second threaded aperture and extending therefrom into contact with said abutment surface of said insert for fixing said insert against movement relative to said cavity.

9. A milling cutter comprising
a rotatable body having
    at least one insert receiving cavity therein which includes
        means for supporting an insert so that the cutting edge thereon does not contact the surfaces of said cavity,
at least one clamping block mounted in said cavity for movement relative thereto along a first axis and having
    a plurality of wedging surfaces thereon which act between at least one wall of said at least one cavity and a surface of a milling insert adjacent thereto,
    first screw means for selectively moving said clamping block into and out of said cavity, and second screw means for exerting a positive locking force on a milling insert within said cavity, and
an indexable milling insert within said cavity wedged against one wall thereof by said clamping block and positively retained therein by positive abutment contact therewith by said second screw means.

10. The cutter of claim 9 wherein
said indexable milling insert includes
    a surface thereon for wedging contact with said clamping block and
cup means in said surface defining
    an abutment surface extending about the periphery thereof and located concentrically with the axis of said insert.

11. A milling cutter comprising
a body having
    at least one cavity therein open to the periphery of said body and including
        at least one insert abutment means and
        at least one wedging surface therein,
a milling insert having
    a first surface in abutment with said at least one abutment means,
    a cutting edge, and
    a holding means thereon including
        a cup formed with a continuous abutment surface, and
a wedging means in abutment with said wedging surface and said milling insert and including
    means for fixing said wedging means with said cavity and
    means for generating a positive locking force between said wedging means and said insert holding means to prevent removal of said insert from said cavity regardless of the direction of movement of said body including
        screw means which may be treaded through said wedging means and into contact with the abutment surface of said cup to positively retain said insert in said cavity.

* * * * *